(12) United States Patent
Lee et al.

(10) Patent No.: US 8,346,286 B2
(45) Date of Patent: Jan. 1, 2013

(54) PAGING METHOD IN BROADBAND WIRELESS COMMUNICATION SYSTEM

(75) Inventors: Namsuk Lee, Daejeon (KR); Sook Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 371 days.

(21) Appl. No.: 12/820,316

(22) Filed: Jun. 22, 2010

(65) Prior Publication Data

US 2011/0053616 A1  Mar. 3, 2011

(30) Foreign Application Priority Data

Aug. 25, 2009 (KR) ........................ 10-2009-0078803

(51) Int. Cl.
*H04W 68/00* (2009.01)
(52) U.S. Cl. ...................... 455/458; 455/444; 455/435.1; 455/456.1; 370/331
(58) Field of Classification Search .................. None
See application file for complete search history.

(56) References Cited

U.S. PATENT DOCUMENTS

2010/0040023 A1* 2/2010 Gallagher et al. ............ 370/331
2011/0256883 A1* 10/2011 Park et al. ................. 455/456.1

FOREIGN PATENT DOCUMENTS

| KR | 10-2009-0037199 | 4/2009 |
| KR | 10-2009-0045183 | 5/2009 |

* cited by examiner

*Primary Examiner* — Erika A Washington
(74) *Attorney, Agent, or Firm* — Staas & Halsey LLP

(57) ABSTRACT

Provided is a paging method in a broadband wireless communication system. In order to provide a paging service to a terminal in a wireless communication system in which a macrocell base station and a femtocell base station coexist, the femtocell base station receives a deregistration request message from the terminal, and checks whether the femtocell base station can provide a paging service to the terminal. When failing to provide a paging service to the terminal, the femtocell base station receives paging service information from a paging controller, includes paging service information in a deregistration confirmation message, and transmits it to the terminal, and the macrocell base station provides a paging service to the terminal.

11 Claims, 7 Drawing Sheets

- Prior Art -

- Prior Art -

PAGING METHOD IN BROADBAND WIRELESS COMMUNICATION SYSTEM

CROSS-REFERENCE TO RELATED APPLICATION

This application claims priority to and the benefit of Korean Patent Application No. 10-2009-0078803 filed in the Korean Intellectual Property Office on Aug. 25, 2009, the entire contents of which are incorporated herein by reference.

BACKGROUND OF THE INVENTION (a) Field of the Invention

The present invention relates to a paging method in a broadband wireless communication system.

(b) Description of the Related Art

A femtocell base station represents a very small base station that is installed to provide services to users within a 30-meter radius such as in houses or buildings. The femtocell base station is installed in a macrocell, and it provides services by having excellent QoS that is better than the case of providing the service to the user through a macrocell base station.

Also, since the femtocell base station is connected to the network by using a general-purpose Internet circuit, the service can be provided with inexpensive installation and maintenance costs. The service is provided to the user in any area in which the Internet is connected.

A terminal is switched to be in an idle mode when a service provided through the macrocell base station is finished. In the idle mode, the terminal receives a paging signal and updates a position to receive a paging service such as a call receiving service from the network or the base station. In the idle mode entering process, the macrocell base station provides a paging group ID, a temporary identifier for identifying terminals in a paging group, and paging information (e.g., paging period and paging offset) provided by a paging controller to the terminal.

The paging group ID is allocated to a paging group configured with at least one base station. The paging controller transmits the same paging message to all the base stations belonging to the paging group ID. The base stations in the paging group broadcast the received paging message according to a paging period. When moving to a base station belonging to another paging group ID, the terminal updates the paging group ID, the temporary identifier, and the paging information through a position update process.

Currently, the femtocell base station provides the same paging service as the macrocell base station, which will now be described with reference to FIG. 1 and FIG. 2. FIG. 1 shows a general case when different paging group ID's are allocated to a macrocell base station and a femtocell base station, and FIG. 2 shows a general case when the same paging group ID's are allocated to a macrocell base station and a femtocell base station.

As shown in FIG. 1, when the terminal moves from the femtocell base station 20-1 to 20-4 to the macrocell base station 10 or from the macrocell base station 10 to the femtocell base station 20-1 to 20-4, it is required to update the position of the terminal. When the terminal moves frequently, signaling overhead caused by the position update process is increased. This is because the terminal can receive the service from the base station only by acquiring a paging group ID through a terminal position update process since the paging group ID used by the macrocell base station 10 is different from the paging group ID used by the femtocell base stations 20-1 to 20-4.

Therefore, as shown in FIG. 2, when the paging group ID used by the femtocell base stations 20'-1 to 20'-4 are the same as the paging group ID used by the macrocell base station 10', the signaling overhead can be reduced when the terminal has no need to perform the position update process caused by movement between the femtocell base stations 20'-1 to 20'-4 and the macrocell base station 10'. On the contrary, when the femtocell base stations 20'-1 to 20'-4 and the macrocell base station 10' use the same paging group ID, the same paging message is transmitted from the macrocell base station 10' and the femtocell base stations 20'-1 to 20'-4 to the terminal to thereby increase signal interference.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an efficient paging method in a broadband wireless communication system in which femtocell base stations and a macrocell base station coexist.

An exemplary embodiment of the present invention provides a method for providing a paging service to a terminal in a wireless communication system in which a macrocell base station and a femtocell base station coexist, including: the femtocell base station receiving a deregistration request message from the terminal; the femtocell base station determining whether to provide a paging service to the terminal; when the femtocell base station fails to provide a paging service, the femtocell base station receiving paging service information from a paging controller, including the paging service information in a deregistration confirmation message, and transmitting the same to the terminal; and the macrocell base station providing a paging service to the terminal.

Another embodiment of the present invention provides a method for a terminal to receive a paging service in a wireless communication system in which a macrocell base station and a femtocell base station coexist, including: the terminal transmitting a deregistration request message to a connected femtocell base station; receiving a deregistration confirmation message including paging service information from the femtocell base station, and checking whether the femtocell base station supports the paging service; when the femtocell base station does not support the paging service, performing synchronization with the macrocell base station; receiving a paging message from the macrocell base station; and receiving a paging service by re-accessing the macrocell base station.

DETAILED DESCRIPTION OF THE EMBODIMENTS

Figure 1:
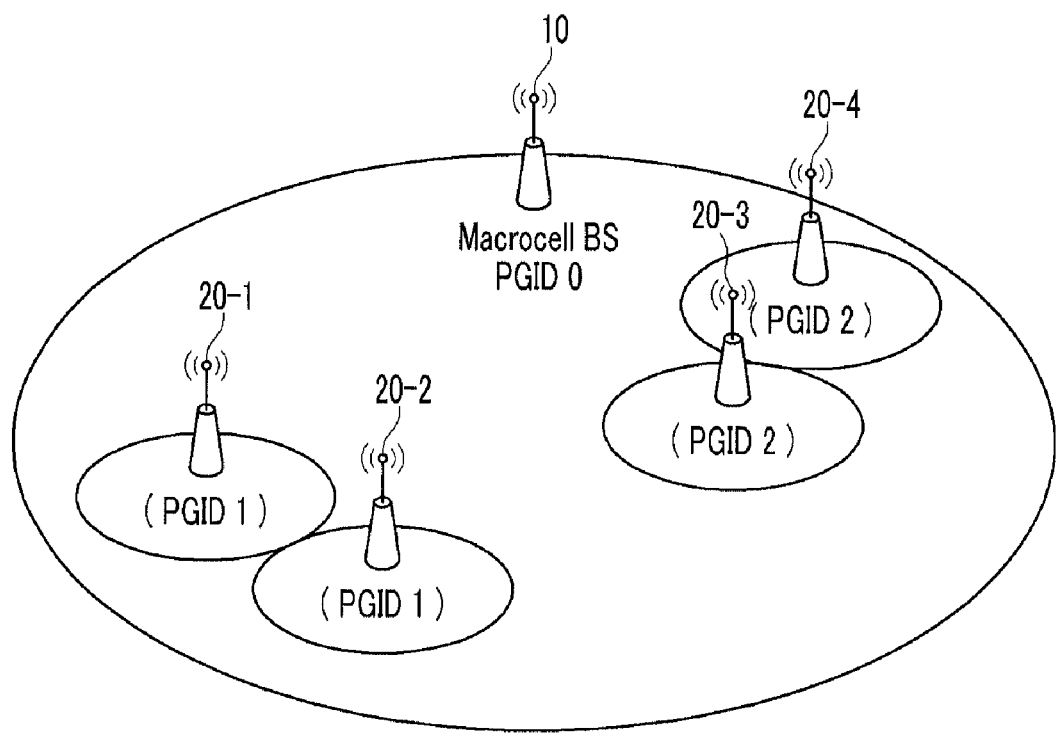
FIG. 1 shows a general case when different paging group ID's are allocated to a macrocell base station and a femtocell base station.
Figure 2:
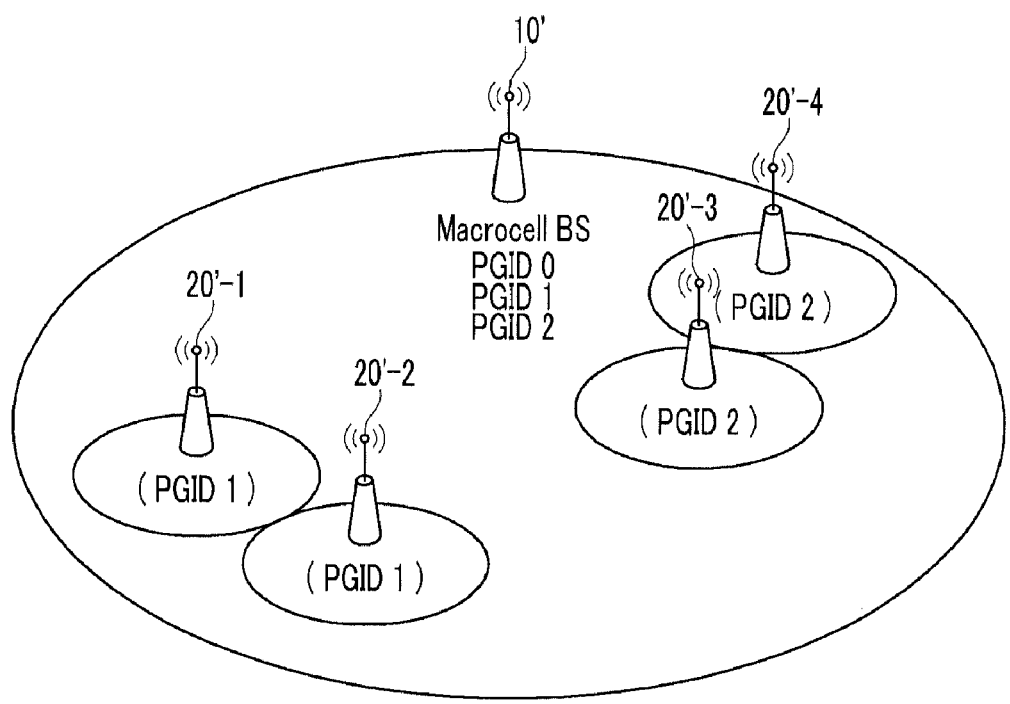
FIG. 2 shows a general case when the same paging group ID's are allocated to a macrocell base station and a femtocell base station.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station (MS), the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

A paging method according to an exemplary embodiment of the present invention will now be described with reference to accompanying drawings.

Figure 3:
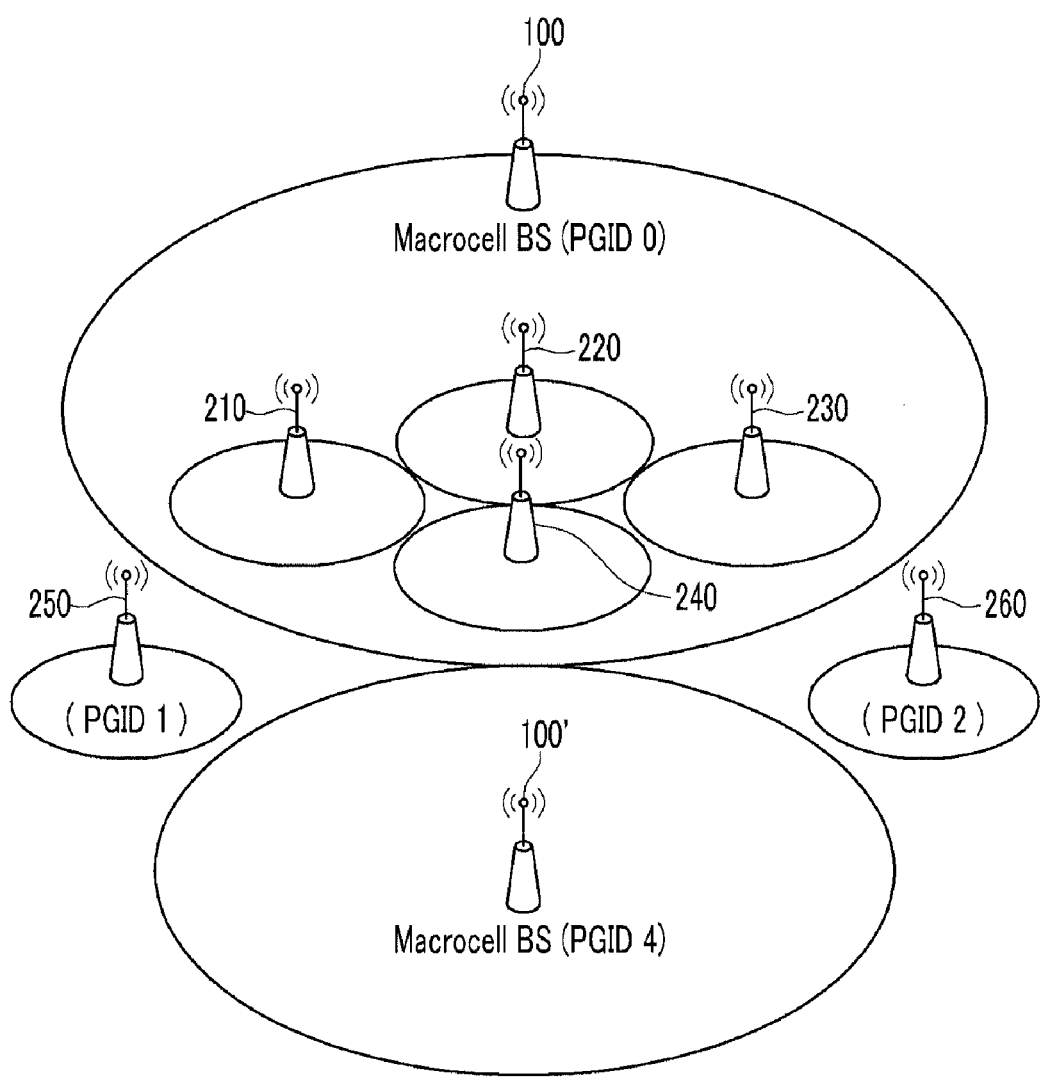
FIG. 3 shows a system in which a macrocell base station and a femtocell base station coexist according to an exemplary embodiment of the present invention.

FIG. 3 shows a system in which a macrocell base station and a femtocell base station coexist according to an exemplary embodiment of the present invention.

As shown in FIG. 3, the condition according to an exemplary embodiment of the present invention is assumed to be that a macrocell base station 100 includes a first femtocell base station to a fourth femtocell base station 210 to 240, and a fifth femtocell base station 250 and a sixth femtocell base station 260 are provided outside the service area of the macrocell base station 100. The paging group ID 0 is allocated to the macrocell base station 100, and the paging group ID 4 is allocated to another macrocell base station 100' that is near the macrocell base station 100.

The femtocell base station determines a paging service support state since the paging service support state depends on whether the femtocell base station is included in the service area of the macrocell base station. When it is a femtocell base station included in the service area of the macrocell base station 100 in a like manner of the first femtocell base station 210 to the fourth femtocell base station 240, the corresponding femtocell base station does not provide the paging service to the terminal. However, when it is not included in the service area of the macrocell base station 100 in a like manner of the fifth femtocell base station 250 and the sixth femtocell base station 260, the corresponding femtocell base station can provide the paging service to the terminal.

A method for providing a paging service to a terminal in the above-noted system condition will now be described with reference to FIG. 4.

Figure 4:
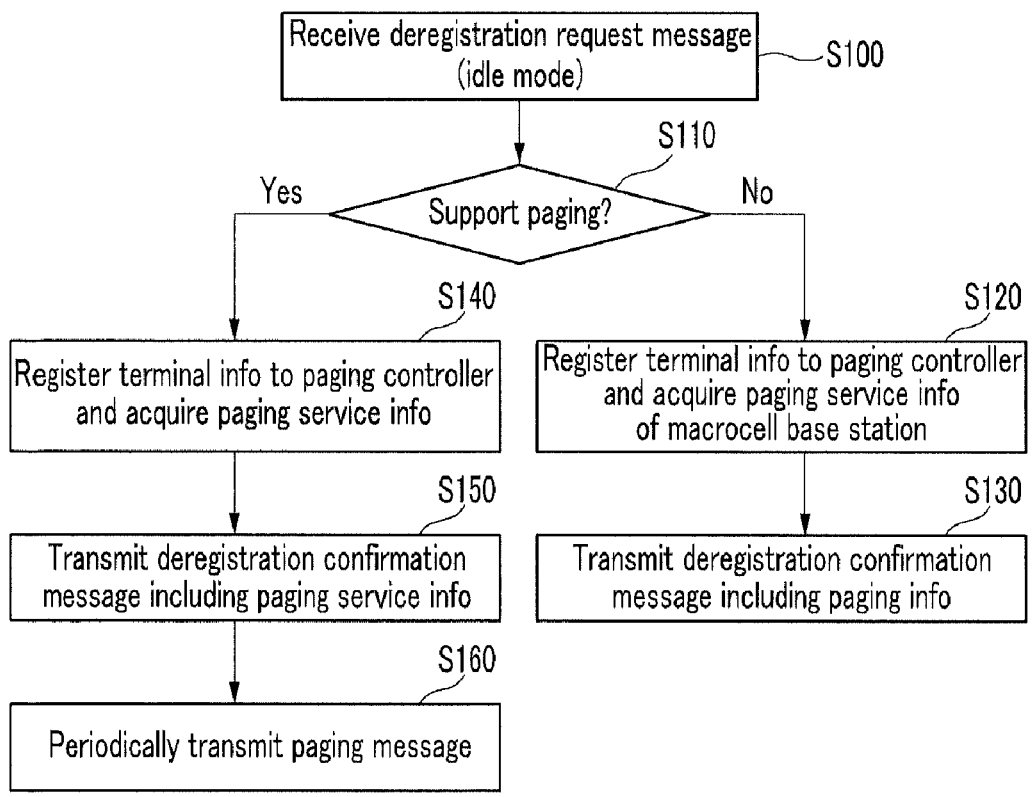
FIG. 4 shows a flowchart of a paging service method by a femtocell base station according to an exemplary embodiment of the present invention.

FIG. 4 shows a flowchart of a paging service method by a femtocell base station according to an exemplary embodiment of the present invention.

As shown in FIG. 4, upon receiving a deregistration request message Dreg-Req from the terminal (S100), the femtocell base station determines whether the femtocell base station supports paging, that is, whether the femtocell base station is positioned in the service area of the macrocell base station (S110). In this instance, the determination can be performed by setting the femtocell when the femtocell base station is installed or when an initial setting process is performed by the network, which is well known to a skilled person and hence will not be described When the femtocell base station supports paging, the femtocell base station registers terminal information to the paging controller, receives paging service information from the paging controller (S140), transmits the paging service information to the terminal (S150), and transmits a paging message periodically provided by the paging controller to the terminal (S160).

However, when the femtocell base station does not support paging, the femtocell base station registers terminal information to the paging controller, acquires paging information of the macrocell base station, and transmits the same to the terminal (S120). Here, the terminal information includes the terminal's media access control (MAC) information, call connection information for the current terminal to be connected to the base station so as to receive a service, and quality of service (QoS) information. The femtocell base station transmits a deregistration confirmation message Dreg-CMD including paging service information to the terminal (S130).

The paging service described briefly with reference to FIG. 4 will now be described in detail with reference to FIG. 5 and FIG. 6. The method shown in FIG. 5 shows a paging service that occurs when the terminal receives a service from the first femtocell base station 210 that is positioned in the service area of the macrocell base station 100.

Figure 5:
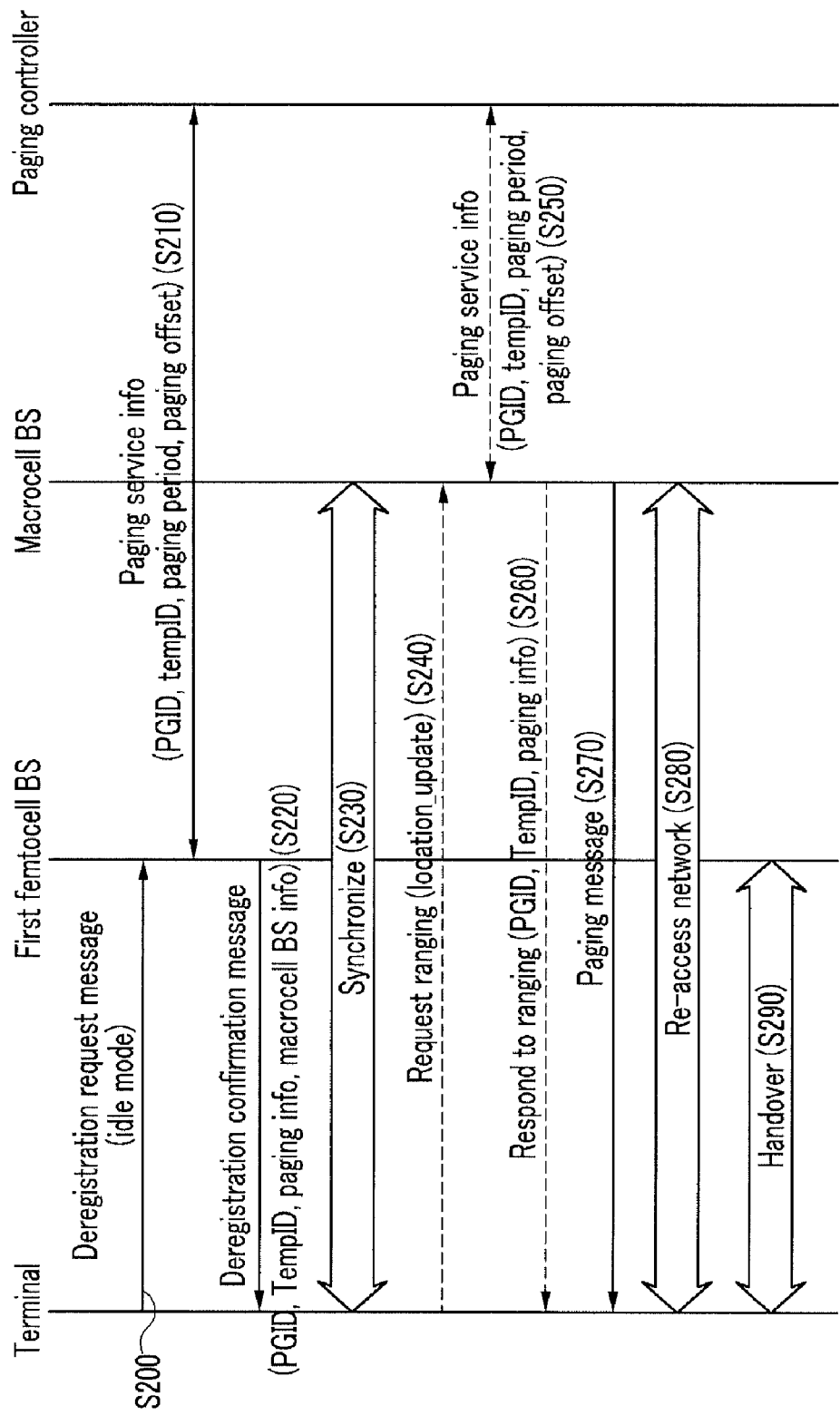
FIG. 5 shows a flowchart of a process for a femtocell base station according to a first exemplary embodiment of the present invention to support paging.

FIG. 5 shows a flowchart of a process for a femtocell base station according to a first exemplary embodiment of the present invention to support paging.

As shown in FIG. 5, when the terminal receiving a service in the service area of the first femtocell base station 210 finishes the service and attempts to enter the idle mode, the terminal transmits a deregistration request message Dreg-Req to the first femtocell base station 210 (S200). When receiving the deregistration request message from the terminal, the first femtocell base station 210 requests paging service information from the paging controller so as to acquire paging service information of the macrocell base station 100 to which the first femtocell base station 210 belongs. In this instance, the position and function of the paging controller are well known to a skilled person, and no detailed description thereof will be provided in the exemplary embodiment of the present invention.

Upon receiving paging service information including a paging group ID of the macrocell base station 100, a paging period, paging offsets, temporary identifier information on the terminal, and identifier information of the macrocell base station 100 from the paging controller (S210), the first femtocell base station 100 includes paging service information in the deregistration confirmation message Dreg_CMD and transmits the same to the terminal (S220). In this instance, the paging service information allows the terminal to use the service when a call receiving signal is generated after the idle mode, and it can also be used for the terminal's position updating or location based service (LBS).

When receiving the deregistration confirmation message from the first femtocell base station 210, the terminal enters the idle mode, and becomes synchronized with the macrocell base station 100 based on the identifier information of the macrocell base station 100 from among the paging service information included in the message (S230). The terminal receives a broadcast paging message from the macrocell base station 100 by using paging service information.

In this instance, the terminal may fail to receive the paging message broadcast by the macrocell base station 100. In this case, the terminal becomes synchronized with the macrocell base station 100 (S230) and transmits a ranging request message RNG_REQ to the macrocell base station 100 so as to update the terminal's position (S240). The macrocell base station 100 transmits the terminal's position information to the paging controller, and the paging controller allocates a new paging group ID, temporary identifier information, a paging period, and paging offsets information to the terminal (S250).

The macrocell base station 100 transmits the ranging response message (RNG_RSP) to the terminal in response to the terminal's position update request, and the message includes new paging service information (a new paging group ID, temporary identifier information, paging period, and paging offset information) allocated by the paging controller (S260). The terminal receives a periodically transmitted paging message by using new paging service information (S270).

In this instance, the terminal receives the paging message from the macrocell base station 100 irrespective of the first femtocell base station 210 at which the terminal is positioned. Here, the stages S240 to S260 can be omitted since they represent the case in which the terminal fails to receive the paging message.

The terminal receives the paging message periodically transmitted by the macrocell base station 100 by using paging service information (S270), and determines whether it is a call-receiving service call that is transmitted to the terminal. Upon receiving the paging message calling the terminal, the terminal performs a call receiving service by re-accessing the macrocell base station 100 (S280). In this instance, since the service call of the terminal is connected to the macrocell base station 100 and the terminal is actually positioned in the service area of the first femtocell base station 210, the terminal performs a handoff from the macrocell base station 100 to the first femtocell base station 210 (S290).

A method for the femtocell base stations 250 and 260 that do not belong to the service area of the macrocell base station 100 to support paging will now be described with reference to FIG. 6. FIG. 6 illustrates a method for supporting the paging service when the terminal is not in the service area of the macrocell base station 100 in a like manner of the fifth femtocell base station 250 or the sixth femtocell base station 260, with the exemplar of the fifth femtocell base station 250.

Figure 6:
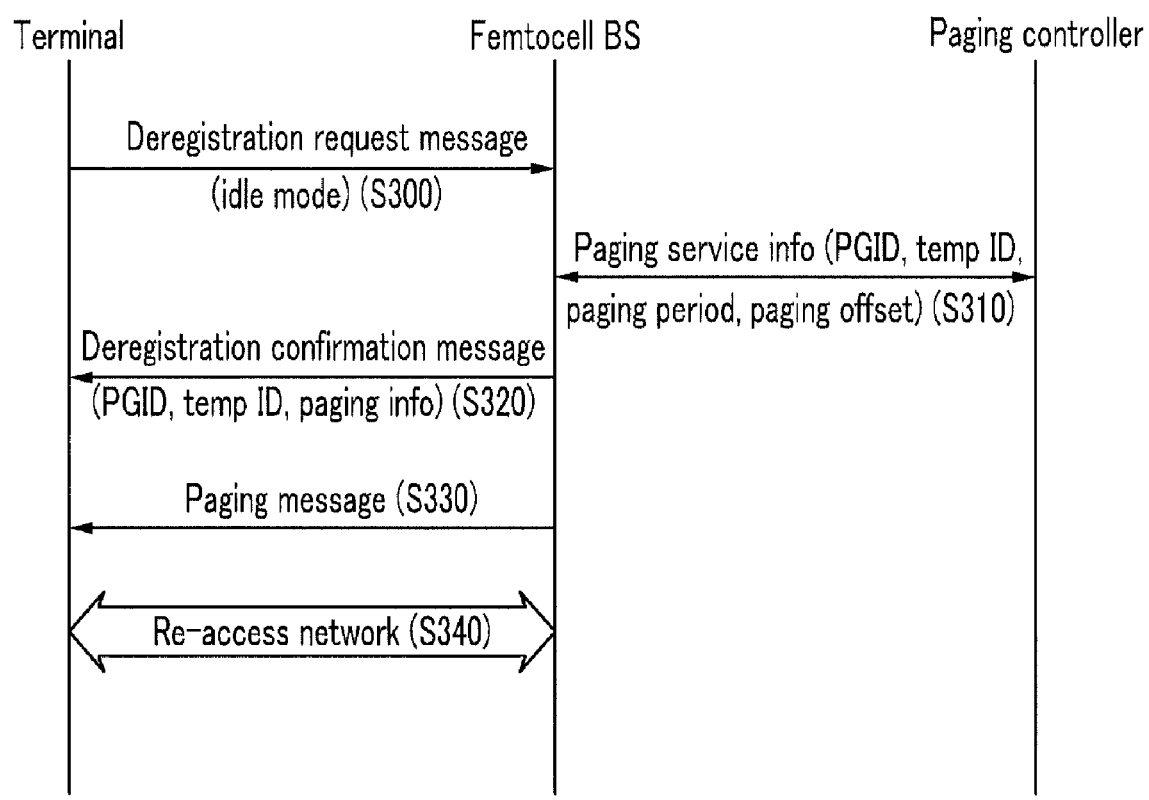
FIG. 6 shows a flowchart of a process for a femtocell base station according to a second exemplary embodiment of the present invention to support paging.

FIG. 6 shows a flowchart of a process for a femtocell base station according to a second exemplary embodiment of the present invention to support paging.

As shown in FIG. 6, when the service is finished, the terminal transmits a deregistration request message to the femtocell base station 100 so as to enter the idle mode (S300).

The fifth femtocell base station 250 receives a paging group ID of the fifth femtocell base station 250, a temporary identifier ID allocated to the terminal, paging period, and paging offset information from the paging controller (S310). In this instance, the fifth femtocell base station 250 receives paging support information since it is not in the service area of the macrocell base station. The fifth femtocell base station 250 includes the information in the deregistration confirmation message and transmits the same to the terminal (S320).

Upon receiving the deregistration confirmation message from the fifth femtocell base station 250, the terminal determines whether paging support information in the message includes identifier information of the macrocell base station 100. When it does not include the identifier information of the macrocell base station 100, the terminal recognizes that the fifth femtocell base station 250 supports the paging service.

The terminal receives a periodically broadcast paging message from the fifth femtocell base station 250 to receive a paging service (S330). Upon receiving the paging message for calling the terminal from the fifth femtocell base station 250, the terminal re-accesses the network to perform a call receiving service (S340).

A process for the terminal to enter the idle mode and receive a paging service while using the service at the femtocell base station will now be described with reference to FIG. 7.

Figure 7:
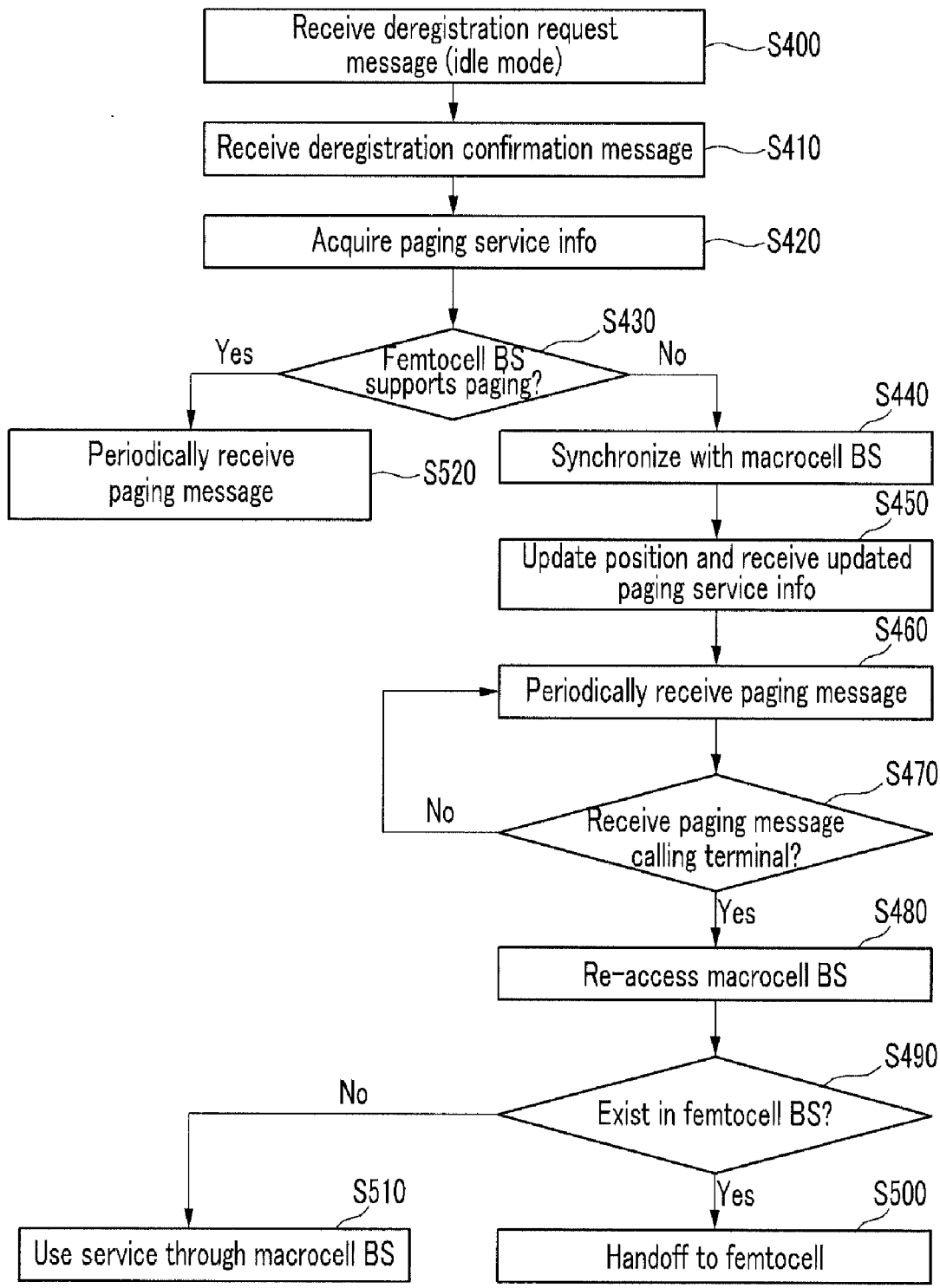
FIG. 7 shows a flowchart of a process for a terminal according to an exemplary embodiment of the present invention to provide a paging service.

FIG. 7 shows a flowchart of a process for a terminal according to an exemplary embodiment of the present invention to provide a paging service.

As shown in FIG. 7, the terminal transmits a deregistration request message to the femtocell base station (S400). When receiving a deregistration response message from the femtocell base station, the terminal enters the idle mode (S410).

The terminal acquires paging service information included in the deregistration response message (S420), and determines based on the paging service information whether the femtocell base station to which the terminal has transmitted the deregistration request message is a base station that supports the paging service or a base station that does not support the paging service (S430). The determination depends on whether the paging service information includes macrocell base station identifier information or not. That is, when the paging service information includes macrocell base station identifier information, the femtocell base station does not support the paging service, and when it does not include the macrocell base station identifier information, the femtocell base station supports the paging service.

When the femtocell base station supports the paging service, the terminal receives the periodically transmitted paging message from the femtocell base station based on the paging service information (S520).

However, when the femtocell base station does not support the paging service, the terminal becomes synchronized with the macrocell base station by using the macrocell base station information included in the deregistration response message (S440). When the terminal receives a position update process request, the terminal performs the position update process and receives updated paging service information (S450).

The terminal receives the periodically transmitted paging message from the macrocell base station 100 (S460), and checks whether the received message is a paging message for calling the terminal (S470). When receiving the paging message for calling the terminal, the terminal re-accesses the macrocell base station to receive a call receiving service (S480).

Upon receiving the call receiving service, the terminal checks whether the terminal is in the service area of the femtocell base station (S490). In this instance, regarding the method for determining whether the terminal is positioned in the service area of the femtocell base station, the preamble received by the terminal through an initialization process includes cell ID information.

The femtocell base station and the macrocell base station respectively have a different allocation range of the cell ID. For example, assuming that the cell ID is allocated below 500 in the case of the macrocell base station, and the cell ID is allocated beyond 500 in the case of the femtocell base station, the terminal can determine in which service area the terminal is positioned by checking the cell ID.

The terminal checks the terminal's position, and performs a handoff from the macrocell base station to the femtocell base station when the terminal is positioned in the service area of the femtocell base station (S500). However, when the terminal is positioned in the service area of the macrocell base station, the terminal continues to receive the service through the macrocell base station (S510).

According to an embodiment of the present invention, the femtocell base station in the coverage of the macrocell base station does not support the paging service in the broadband wireless communication system in which the macrocell base station and the femtocell base station coexist, thereby generating no signal interference.

Further, when the terminal frequently moves to the service area of the femtocell base station and the service area of the macrocell base station, frequent generation of position updating is prevented.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing a paging service to a terminal in a wireless communication system in which a macrocell base station and a femtocell base station coexist, comprising:
   the femtocell base station receiving a deregistration request message from the terminal;
   the femtocell base station determining whether to provide a paging service to the terminal;
   when the femtocell base station fails to provide a paging service, the femtocell base station receiving paging service information from a paging controller, including the paging service information in a deregistration confirmation message, and transmitting the same to the terminal; and
   the macrocell base station providing a paging service to the terminal.

2. The method of claim 1, wherein
   the providing of a paging service includes:
   the macrocell base station performing synchronization with the terminal;
   the macrocell base station transmitting a paging message for providing a paging service to the terminal; and
   the macrocell base station re-accessing the terminal and providing a paging service.

3. The method of claim 2, further comprising:
   the macrocell base station receiving a ranging request message for updating the terminal's position information from the terminal;
   the macrocell base station receiving new paging service information from the paging controller; and
   the macrocell base station including the received new paging service information in the ranging response message and transmitting the same to the terminal.

4. The method of claim 3, wherein
   the paging service information includes paging group identifier information of the macrocell base station, temporary identifier information that is allocated to the terminal, paging period information, paging offset information, and identifier information of the macrocell base station.

5. The method of claim 4, wherein
   the femtocell base station is positioned in the service area of the macrocell base station.

6. The method of claim 4, further including:
   when it is determined that the femtocell base station provides a paging service to the terminal,
   the femtocell base station receiving paging service information including paging group identifier information of the femtocell base station, temporary identifier information that is allocated to the terminal, paging period information, and paging offset information from the paging controller; and
   the femtocell base station providing a paging service to the terminal by transmitting a paging message to the terminal.

7. A method for a terminal to receive a paging service in a wireless communication system in which a macrocell base station and a femtocell base station coexist, comprising:
   the terminal transmitting a deregistration request message to a connected femtocell base station;
   receiving a deregistration confirmation message including paging service information from the femtocell base station, and checking whether the femtocell base station supports the paging service;
   when the femtocell base station does not support the paging service, performing synchronization with the macrocell base station;
   receiving a paging message from the macrocell base station; and
   receiving a paging service by re-accessing the macrocell base station.

8. The method of claim 7, wherein
   the receiving of a paging message includes:
   the terminal transmitting a ranging request message to the macrocell base station so as to update position information;
   receiving a ranging response message including new paging service information from the macrocell base station; and
   receiving the paging message by using the new paging service information.

9. The method of claim 7, wherein
   the receiving of a paging service includes:
   checking whether the terminal is positioned in the service area of the femtocell base station; and
   when the terminal is positioned in the service area of the femtocell base station, performing a handoff from the macrocell base station to the femtocell base station.

10. The method of claim 7, wherein,
when the femtocell base station supports the paging service, receiving a paging message from the femtocell base station.

11. The method of claim 7, wherein
checking whether the femtocell base station supports the paging service includes:
checking whether the paging service information includes identifier information of the macrocell base station; and confirming that the femtocell base station does not support the paging service when the paging service information includes identifier information of the macrocell base station, and confirming that the femtocell base station supports the paging service when the paging service information does not include identifier information of the macrocell base station.

* * * * *